2,718,938
ANTI-WHEEL-SLIDE BRAKE CONTROL APPARATUS

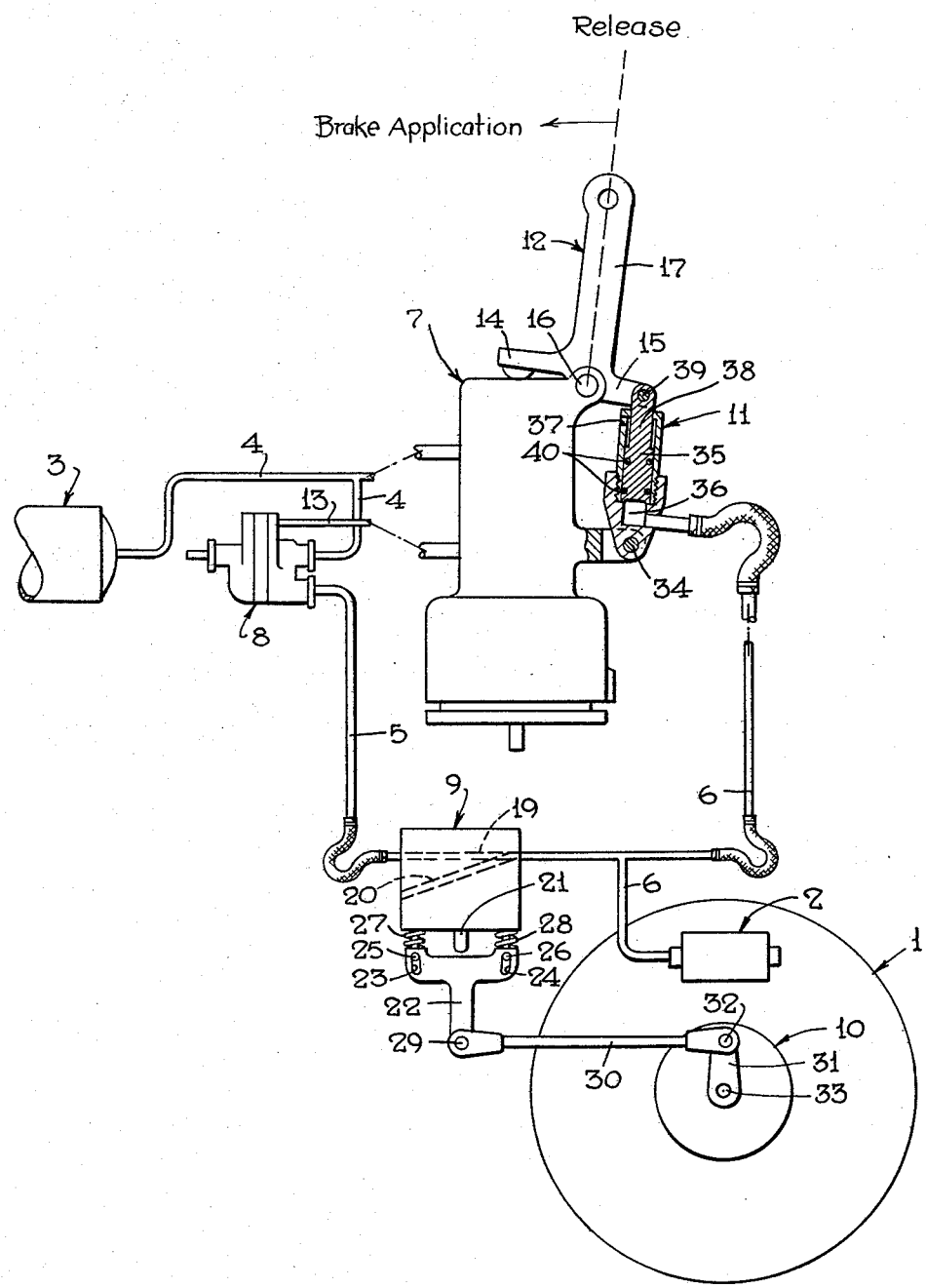

Charles W. Berkoben, Irwin, Pa., assignor to Westinghouse Air Brake Company, Wilmerding, Pa., a corporation of Pennsylvania Application August 25, 1953, Serial No. 376,358

7 Claims. (Cl. 188—181)

This invention relates to anti-wheel-slide brake control apparatus for vehicles, such as aircraft, and, more particularly, to such an apparatus having means for apprising the operator of a vehicle when the anti-wheel-slide equipment is operating in response to a slipping condition of the vehicle wheel in order that the operator may reduce the degree of brake application and thereby reduce the likelihood of repeated wheel slipping cycles.

In order to prevent sliding of the wheel, that is, the dragging of the wheel in a locked condition on the runway, and, consequently, excessive wear of tires, anti-wheel-slide devices have been devised, such as that, for example, disclosed in U. S. Patent No. 2,573,387 issued to Rankin J. Bush on October 30, 1951. The brake control apparatus disclosed in the aforementioned patent includes a wheel-slip responsive device which functions automatically to prevent a brake application during initial acceleration of the wheel upon touchdown until said wheel has accelerated substantially to the ground speed of the vehicle or, in response to a slipping condition of the wheel, to release the brakes, if they have already been applied, for permitting the wheel to accelerate back to ground speed of the vehicle. The term "slipping," as distinguished from "sliding," refers to the condition existing when the wheel is decelerating at an excessively rapid rate toward a locked condition as a result of application of a braking force exceeding the permissible limit of adhesion of the tread to the ground. Upon termination of the slipping condition, the anti-wheel-slide device will operate automatically, as just described, as many times as a slipping of the wheels occurs, until the vehicle is brought to a stop.

Results of tests which have been made with vehicles, particularly airplanes, equipped with anti-wheel-slide devices, show that, in operation, the operator of the vehicle or pilot generally is unaware of a slipping of the wheel or wheels or that the anti-wheel-slide device is operating during the time that such slipping occurs. This unawareness, especially with respect to the pilot of an airplane, is due largely to the high speed at which the airplane lands and the heavier weight of present day airplanes. If the pilot were aware that the wheel or wheels were slipping, he could reduce the brake-applying force accordingly through the brake control valve.

The object of my invention, therefore, is to provide an improved brake control apparatus of the type above described having means whereby the operator of a vehicle, or the pilot of an airplane, will be apprised by sense of "feel" on the brake control pedal or lever at the time that a slipping condition of the wheel occurs in order that he may reduce the braking force applied to said wheel and thus minimize the number of repeated wheel-slipping cycles occurring when bringing the vehicle to a stop.

More specifically, the object of my invention is to provide a vehicle brake control apparatus of the type indicated in the foregoing object characterized by a balancing cylinder device, interlocked with the brake control device and the wheel brake cylinder device, which will exert a force on the operator's lever of the brake control device corresponding to the degree of a brake application to thereby apprise the pilot by sense of "feel" of the automatic releasing and re-applying of the brakes when effected by the anti-wheel-slide device at the time a slipping of the wheel occurs.

Other objects and advantages of the invention will appear in the following more detailed description thereof when read in conjunction with the accompanying drawing, wherein:

The single figure is a diagrammatic view, partly in section and partly in outline, of a brake control apparatus embodying the invention.

Description

In the drawing the numeral 1 designates a wheel adapted to be braked by a brake control apparatus comprising a wheel brake application device 2, a source of fluid under pressure, such as a reservoir 3, which may be connected to said brake cylinder device by conduit means comprising pipes 4, 5 and 6, a brake control valve device 7, a relay valve device 8, a release valve device 9, an anti-wheel-slide, or control device 10 and a counterbalancing cylinder device 11 mounted on said brake control valve device and interlocked through pipe 6 with said brake application device.

The brake application device 2 may be the usual type brake cylinder adapted to be arranged in conventional manner for applying brakes (not shown) to the wheel 1. While not shown in the drawing and not deemed essential to an understanding of the invention, the casing of the brake application device 2 contains a piston at one side of which there is a pressure chamber, which may be connected through pipes 6, 5, 4 to the reservoir 3, and at the opposite side a non-pressure chamber open to atmosphere through a vent port in the casing. The piston has a piston rod extending through the non-pressure chamber to the exterior of the casing and adapted for operating brake shoes or brake elements (not shown) into braking engagement with a braking disc or drum on the wheel 1. Upon admission of fluid pressure from the reservoir 3 into the pressure chamber of the brake application device 2, the piston and the piston rod will be operated to a brake application position in which a brake application is effected on the wheel 1, and upon release of such pressure from said chamber, said piston and piston rod will be returned by a return spring in the non-pressure chamber to a normal position in which a brake release is effected.

The brake control valve device 7, which is shown in outline in the drawing and which is connected to the reservoir 3 by way of pipe 4, is a manually operable, self-lapping type adapted to accurately maintain a selected amount of fluid pressure supplied to the brake application device 2 from said reservoir through the relay valve device 8, which is connected by a pipe 13 to said brake valve device. Since reference may be had to publication number APC 18210-1 of the Industrial Products Division of the Westinghouse Air Brake Company, published January 31, 1949, wherein the brake control valve device 7, designated as the "AP-1 Brake Valve," is shown in detail and adequately described functionally, it is deemed sufficient, for purposes of illustrating the invention, to give herein just a brief description of the function of said brake valve device without showing the details thereof. An operating lever 12 is pivotally mounted at the junction of two oppositely extending arms 14 and 15 of said lever to the casing of the brake valve device, while a third arm 17 extends perpendicularly from said junction of said two arms and is adapted to be connected by suitable linkage (not shown) to either a foot pedal or hand lever, neither of which is shown, mounted in the operator's or pilot's cabin for actuating said operating lever.

The operating lever 12 is pivotally operable about the pin 16 in a counter-clockwise direction, as viewed in the drawing, out of a normal "Release" position, in which it is shown in the drawing, into a "Brake application" zone to effect supply of fluid, at a pressure proportional to the degree of movement out of "Release" position in the direction indicated in the drawing by the arrow to the relay valve device 8 by opening communication between pipes 4 and 13.

The relay valve device 8, which is also shown in outline in the drawing, is interposed between pipes 4 and 5 and is operative to effect supply of fluid at a pressure controlled by pressure of fluid established in pipe 13 by the brake valve device 7, as above described, from reservoir 3 to the brake application device 2. A detailed description of the relay valve device 8 herein is not deemed essential to an understanding of the invention, and, therefore, reference is made to publication number APC 18214-1 of the Industrial Products Division of the Westinghouse Air Brake Company, published February 19, 1949, wherein said relay valve device, designated as the "AP-1 Relay Valve," is described in detail, both structurally and functionally. It is deemed sufficient to mention here that the principal function of the relay valve device 8 is to provide means whereby a faster brake application and release can be effected than by use of the brake valve device 7 alone. A relatively small volume of fluid under pressure of the brake valve device 7 admitted into the relay valve device 8 by way of pipe 13, at a pressure determined by the distance through which the lever 12 of said brake valve device is operated out of its "Release" position, will effect operation of said relay valve device to open a communication between pipes 4 and 5 to admit from the reservoir 3 a much larger volume of fluid at said determined pressure into said pipe 5 leading to the release valve device 9. It follows that when the operating lever 12 of the brake valve device 7 is in its "Release" position, so that no fluid under pressure is flowing through said brake valve device to the relay valve device 8, said relay valve device will operate to close the communication between pipes 4 and 5 so that no fluid under pressure from the reservoir 3 may flow to the release valve device 9.

The release valve device 9, which is shown in outline in the drawing, is interposed between pipes 5 and 6 for controlling communication therebetween and between pipe 6 and atmosphere, and may be, for example, of the type described in detail in the aforementioned patent issued to Rankin J. Bush.

Briefly, the device 9 comprises valve means (not shown) having a normal position, in which pipes 5 and 6 are connected by way of a communication 19 indicated, schematically, by broken lines and a fluid pressure release position, in which pipes 5 and 6 are disconnected, and pipe 6, and thereby the brake application device 2 and the cylinder device 11, are open to atmosphere by way of a communication 20 indicated, schematically, by broken lines.

The release valve device 9 also comprises a pilot valve (not shown) mechanically operable for causing one or the other of communications 19 or 20 to be established. This pilot valve has a stem 21 projecting through the casing of valve device 9 to the exterior thereof, said valve stem being arranged to have its projecting end engaged by a T-shaped operating lever 22 at the junction of two oppositely extending arms. The two arms of lever 22 have near their respective ends slots 23 and 24 through which pins 25 and 26, secured to the casing, extend, respectively. Two like springs 27 and 28, under pressure, are interposed between the casing of the device 9 and the opposite ends of the two arms, respectively, of the operating lever 22 to bias said lever to a central, normal position in which said lever disengages the end of the valve stem 21 to establish communication 19 and to close communication 20, said operating lever being pivotable about each of the pins 25 or 26 so as to engage and move the valve stem 21 into the device 9 to effect closing of communication 19 and establishment of communication 20. A portion of operating lever 22 depends from the junction of the two oppositely extending arms and is pivotally connected at its lower end by means of a pin 29 to one end of a link rod 30, the other end of said link rod being pivotally connected to one end of a rocker arm 31 by means of a pin 32. The other end of the rocker arm 31 is rigidly attached to an operating shaft 33 of the control device 10.

The control device 10, which is shown in outline in the drawing, may be of any suitable type, but preferably of the rotary type disclosed in the aforementioned patent issued to Rankin J. Bush, including a housing adapted to be coaxially and fixedly mounted on the wheel 1 for rotation therewith. While not shown in the drawing and not deemed essential to an understanding of the invention, the housing of the control device 10 contains an inertia mass rotatable therein and connected through clutch means and a cluster of planetary gears to the operating shaft 33, so that, when rotation of said inertia mass is in synchronization with the rotation of the wheel 1 or what may be called a normal rotating position occupied when said wheel is not slipping on the running surface, no rotational force is produced on said operating shaft, but when, as applied to an airplane, said wheel is accelerating to ground speed immediately following touch-down or when said wheel is decelerating in response to slip on the running surface, said inertia mass will either lag behind or overrun, respectively, said wheel to thereby cause a rotational force to be exerted on said shaft which in turn operates the release valve device 9 to establish release communication 20.

According to the invention, the counterbalancing cylinder device 11 is provided for physically apprising the operator or pilot of the vehicle when the control device 10 is operating to effect operation of the release valve device 9 in response to a slipping condition of the wheel 1. The casing of the counterbalancing cylinder device 11 is pivotally mounted at its one end to the casing of the brake valve device 7 by means of a pin 34 and is bored from the opposite end to slidably receive a piston 35 which may be subjected on one side to pressure of fluid supplied from pipe 6 to a chamber 36 defined by said casing and said piston, while the opposite side, or non-pressure side, of said piston is open to atmosphere by way of a port 37 in said cylinder device casing. The piston 35 has associated therewith a follower portion 38 of smaller diameter which extends coaxially away from the non-pressure side of said piston to the exterior of the casing and which is adapted to be pivotally connected at its exterior end by means of a pin 39 to the end of arm 15 of the operating lever 12. Leakage of fluid pressure from chamber 36 past the piston 35 is prevented by sealing rings 40 disposed in said piston and having sealing and sliding contact with the bore surface of the casing of the device 11.

Operation

For purposes of illustrating the operation of the invention, such operation will be described in connection with one landing wheel of an airplane, but it should be understood that the invention may be adapted equally as well for other vehicles and that each of the wheels desired to be braked should be similarly equipped with a control device 10 and a release valve device 9 connected in parallel with the release valve device 9 shown in the drawing between pipes 5 and 6.

Let it be assumed that reservoir 3 is charged with fluid under pressure, that the several devices comprising the brake control apparatus are in their respective normal positions, and that the landing wheels of the airplane, in landing, have just made contact with the surface of the runway. The pilot of the airplane, upon touchdown of the landing wheels on the runway surface or shortly thereafter, will effect operation of the lever 12 of the brake valve device 7 in a counterclockwise direction, as viewed in the drawing, by operating the brake pedal or hand lever in the cabin, thereby causing fluid at a pressure, as determined by the extent to which the lever 12 is operated out of its "Release" position, to be admitted into pipe 5 from the reservoir 3 through pipe 4 and the relay valve device 8, as above described.

Immediately upon touchdown of wheel 1, said wheel will start to accelerate and overrun the inertia mass contained in the control device 10 and thereby effect an angular movement of the operating shaft 33 and the rocker arm 31 out of normal position in a clockwise direction, for example, as viewed in the drawing. This movement of arm 31, acting through link 30, will rock lever 22 of the release valve device 9 about the pin 25 in a counterclockwise direction, as viewed in the drawing, against the opposing force of spring 28. This rocking of lever 22 will actuate the stem 21 and the pilot valve contained in the release valve device 9 to render communication 19 ineffective and communication 20 effective, thereby releasing any fluid pressure in the brake application device 2 and the counterbalancing cylinder device 11 to atmosphere by way of pipe 6 and communication 20.

The control device 10 will respond to initial acceleration of the wheel 1 to open the devices 2 and 11 to atmosphere, as just described, almost instantaneously at the start of said acceleration of said wheel upon touchdown and thereby rapidly release a brake application if prematurely initiated by the pilot.

When, after touchdown, the wheel 1 has become accelerated to substantially ground speed, the inertia mass in the control device 10 will become synchronized therewith and spring 28 then acts to return lever 22 to its normal position out of contact with valve stem 21, thereby permitting the pilot valve contained in the release valve device 9 to operate to disestablish communication 20 and reestablish communication 19. With communication 19 reestablished, fluid at desired braking pressure, determined by the position of lever 12 of the brake valve device 7, will be transmitted through pipe 6 to the brake application device 2 to effect braking of wheel 1 and to chamber 36 of the counterbalancing cylinder device 11. Fluid pressure in chamber 36 acting on the piston 35 will tend to urge the lever 12 in a counterclockwise direction about the pin 39, thereby assisting the pilot, with less physical pressure on his part, in maintaining said lever in the application position selected by him by balancing the opposing force of a spring (not shown) contained in the brake valve device 7. The pilot is thus apprised of the application of brakes by sense of "feel" on the foot pedal or hand lever resulting from the diminution of force he is required to exert thereon.

Let it be assumed now that, due to the excessive degree of application of the brakes to wheel 1, or due to said wheel running into an uneven or slippery condition on the runway where the traction is insufficient to keep said wheel rolling against the retarding action of the brake application on said wheel, the wheel 1 begins to slip. In these circumstances, the wheel 1 decelerates relative to the rotary inertia mass in the control device 10 thus causing a rotational force to be exerted on the shaft 33 and the rocker arm 31 so that the arm 31 is rocked in a counterclockwise direction and turns lever 22 from normal position about the pin 26 in a clockwise direction, as viewed in the drawing, against the opposing force of spring 27. The pilot valve contained in the release valve device 9 is thus operated to effect disestablishment of communication 19 and establishment of communication 20, whereby fluid pressure in the brake application device 2 and chamber 36 of the device 11 will be released, as heretofore described, to effect release of the brakes on said wheel.

Release of the fluid pressure in chamber 36 of the counterbalancing device 11 removes the balancing force, acting through piston 35, on the lever 12 of the brake valve device 7, thereby allowing the spring contained in said brake valve device to offer a greater resistance to the physical pressure maintained by the pilot on the foot pedal or hand lever. Since the control device 10 and the release valve device 9 react almost instantaneously to a slipping of the wheel 1 to release the fluid pressure in chamber 36 of the counterbalancing device 11, the reaction of the lever 12 to the pilot's physical pressure on the foot pedal or hand lever will be in the nature of a sudden kickback by which the pilot will be apprised that said wheel is slipping. This kickback, in effect, will be an indication to the pilot that the braking forces acting on the wheel 1 are excessive relative to the traction on the runway surface. Being apprised of the slipping of the wheel 1, in the manner just described, the pilot may then reduce his pressure on the foot pedal or the hand lever to allow the lever 12 of the brake valve device 7 to be rotated about the pin 39 in a clockwise direction, as viewed in the drawing, toward its "Release" position for reducing the amount of fluid pressure admitted into pipe 5 from the reservoir 3 by the relay valve device 8, as above described.

Upon release of the brakes on the wheel 1 in response to a slipping thereof, as above described, said wheel will accelerate back to the ground speed of the airplane whereupon the control device 10 will effect operation of the release valve device 9 to disestablish communication 20 and reestablish communication 19 to allow fluid at a reduced pressure to be transmitted through pipe 6 to the brake application device 2 to reapply the brakes on said wheel. Unless further slipping of the wheel 1 occurs, the pilot may increase the braking forces on said wheel by effecting further movement of the lever 12 of the brake valve device 7 in a counterclockwise direction, as above described. If the wheel 1 again starts to slip before the airplane comes to a stop, the brakes thereon will again be automatically released, the pilot may make adjustment of the fluid pressure supplied thereto and, upon cessation of wheel slip, the brakes will be reapplied in the same manner as above described, until eventually the airplane comes to a stop, it being noted that the fluid pressure in the reservoir 3 is not unncessarily drained and that actual slipping of said wheel may be held to a minimum number of repeated cycles through proper adjustment by the pilot of the fluid pressure operating the brake apparatus when he is apprised by the counterbalancing cylinder device 11 that said wheel is slipping.

Summary

From the above description it will now be seen that, according to the invention, there has been provided an improved brake control apparatus of the type which is responsive to a slipping of the wheels and to cessation of said slipping to automatically release and reapply, respectively, the brakes on said wheels, characterized by means for apprising the operator of the vehicle by sense of "feel" on the brake pedal or lever that a slipping of the wheels is occurring in order that he may accordingly reduce the fluid pressure effecting the brake application, thereby conserving the supply of fluid under pressure available for operating the brake apparatus and minimizing the number of reoccurring wheel slipping cycles.

Having now described my invention, what I claim as new and desire to secure by Letters Patent, is:

1. In a brake control apparatus for a wheel of a vehicle, in combination, brake application means responsive to fluid pressure for effecting a brake application on said wheel and to relief of such pressure for effecting a brake release, a source of fluid under pressure, conduit means providing for flow of fluid under pressure from said source to said brake application means, valve means for controlling the supply of fluid under pressure through said conduit means from said source to said brake application means, an operator-controlled lever associated with said valve means and movable by manual force applied thereto in one direction for effecting operation of said valve means to a position in which fluid under pressure is supplied to said brake application means, and fluid pressure operable means responsive to fluid pressure supplied to said brake application means for exerting another force on said lever according to the pressure of fluid supplied to said brake application means and in the same direction as said manually applied force and for simultaneously releasing said other force upon release of fluid pressure from said brake application means.

2. In a fluid pressure operable brake control apparatus for a wheel of a vehicle, in combination, brake application means responsive to fluid pressure for effecting a brake application on said wheel and to relief of such pressure for effecting a brake release, means responsive to a slipping condition of said wheel for automatically relieving said brake application means of such pressure for effecting a brake release, a source of fluid under pressure, conduit means providing for flow of fluid under pressure from said source to said brake application means, valve means for controlling the pressure of fluid supplied through said conduit means from said source to said brake application means, an operator-controlled lever associated with said valve means and movable by manual force applied thereto in one direction for effecting operation of said valve means to supply fluid under pressure to said brake application means, and fluid pressure operable means responsive to the fluid pressure supplied to said brake application means for exerting an additional force on said operator-controlled lever according to the pressure of fluid supplied to said brake application means and in the same direction as said manually applied force and for simultaneously releasing said other force upon release of fluid pressure from said brake application means by said wheel-slip responsive means.

3. A brake control apparatus comprising, in combination, brake application means responsive to fluid pressure for effecting a brake application on a vehicle wheel and to relief of such pressure for effecting a brake release, means responsive to a slipping condition of said wheel for automatically relieving said brake application means of said fluid pressure for effecting a brake release, a source of fluid under pressure, conduit means providing for flow of fluid under pressure from said source to said brake application means, operator-controlled valve means for controlling the pressure of fluid supplied through said conduit means to said brake application means from said source, and means responsive to fluid pressure supplied to said brake application means for exerting a corresponding operating force on said operator controlled valve means and responsive to relief of fluid pressure from said brake application means by said wheel-slip responsive means for instantaneously and completely relieving said operator-controlled valve means of said corresponding operating force to effect an indication to the operator through said operator-controlled valve means of a wheel-slip occurrence.

4. A brake control apparatus comprising, in combination, a brake application device responsive to fluid pressure for effecting a brake application on a vehicle wheel and to relief of such pressure for effecting a brake release, a source of fluid under pressure, conduit means providing for flow of fluid under pressure from said source to said brake application device, operator-controlled valve means including an operating lever for effecting supply of fluid through said conduit means to said brake application device from said source at a pressure proportional to force manually applied to said lever, a release valve device having a normal position for effecting supply of fluid under pressure to said brake application device and operable to another position for relieving said brake application device of fluid pressure, a control device associated with said vehicle wheel having means interconnected with said release valve device and responsive to a slipping condition of said wheel for effecting operation of said release valve device to its said other position and responsive to cessation of said slipping condition for effecting operation of said release valve device to its normal position, and a cylinder device interconnected with said brake application device and operatively engaging said lever for exerting a force thereon in assistance to said manually applied force and proportional to the degree of fluid pressure supplied to said brake application device, and for instantaneously and completely relieving said lever of said assisting force upon relief of fluid pressure from said brake application device to thereby produce a sudden kickback reaction on said lever for apprising the vehicle operator of a wheel-slip occurrence.

5. A brake control apparatus comprising, in combination, a brake application device operable in response to fluid pressure for effecting a brake application on a vehicle wheel and operative in response to relief of such pressure for effecting a brake release, a source of fluid under pressure for said brake application device, valve means including an operating lever which is manually operable to an application position for controlling the pressure of fluid supplied to said brake application device from said source, control means for automatically relieving said brake application device of fluid pressure in response to a slipping condition of said wheel and for automatically effecting supply of fluid pressure to said brake application device in response to cessation of said slipping condition, and a cylinder device having a pressure chamber open to said brake application device and a piston responsive to fluid pressure in said chamber corresponding to that supplied to said brake application device for exerting a corresponding operating force on said lever and for instantaneously and completely relieving said operating lever of said corresponding operating force upon relief of fluid pressure from said brake application device to thereby effect an indication through said operating lever by producing a kickback effect thereon for apprising the vehicle operator of the occurrence of a wheel-slip.

6. A brake control apparatus for a vehicle wheel comprising, in combination, a brake application device responsive to fluid pressure to operate to an application position for effecting a brake application on said wheel and to relief of such pressure to operate to a normal position for effecting a brake release, a source of fluid under pressure, conduit means by which fluid under pressure may be transmitted from said source to said brake application device, valve means for controlling communication therethrough including an operating lever which is manually operable out of a normal release position, in which communication through said conduit means is closed, to an application position in which said communication is open to permit flow of fluid at a pressure determined by the amount of movement of said operating lever away from said normal release position, a release valve device interposed in said conduit means between said brake application device and said valve means for automatically controlling communication through said conduit means when said valve means is operated to an application position, a control device adapted to respond to a slipping condition of said wheel for operating said release valve device to a release position to close said communication and to relieve said brake application device of fluid pressure and to respond to cessation of slipping of the wheel for operating said release valve device to a normal position to restore said communication, and a cylinder device connected with said brake application device and adapted upon operation of said application device to its said application position to exert a corresponding operating force on said operating lever and upon operation of said application device to its said normal position to instantaneously and completely relieve said operating lever of said corresponding operating force for effecting a kickback thereon whereby the vehicle operator is apprised of a wheel-slip occurrence.

7. In a brake control apparatus for a vehicle wheel, in combination, brake application means responsively operable to fluid pressure for effecting a brake application on said wheel and to relief of such pressure for effecting a brake release, a source of fluid under pressure, conduit means providing for flow of fluid under pressure from said source to said brake application means, manually operable valve means for controlling the degree of fluid pressure supplied through said conduit means to said brake application means from said source, control means associated with said vehicle wheel and interlocked with said brake application means for automatically relieving said brake application means of fluid pressure in response to a slipping condition of said wheel and for restoring supply of fluid pressure to said brake application means upon cessation of said slipping condition, and means associated with said valve means and instantaneously responsive to variations of fluid pressure in said brake application means for effecting a kickback reaction through said manually operable valve means upon release of fluid pressure from said brake application means by said control means whereby the vehicle operator is apprised of the occurrence of said wheel-slipping and may correspondingly reduce the degree of fluid pressure flowing to said brake application means to minimize the number of wheel-slipping cycles.

References Cited in the file of this patent

UNITED STATES PATENTS

| | | |
|---|---|---|
| 2,275,338 | Andres et al. | Mar. 3, 1942 |
| 2,530,659 | Hill | Nov. 21, 1950 |
| 2,573,387 | Bush | Oct. 30, 1951 |